(12) United States Patent
Ritchey

(10) Patent No.: US 7,169,008 B2
(45) Date of Patent: *Jan. 30, 2007

(54) METHOD AND APPARATUS FOR REDUCING RISK THAT A CLOSURE ON STUFFED TOY WILL INJURE OR BE DAMAGED BY AN ANIMAL

(76) Inventor: Sharon A. Ritchey, P.O. Box 25896, Scottsdale, AZ (US) 85255

( * ) Notice: Subject to any disclaimer, the term of this patent is extended or adjusted under 35 U.S.C. 154(b) by 231 days.

This patent is subject to a terminal disclaimer.

(21) Appl. No.: 10/896,320

(22) Filed: Jul. 20, 2004

(65) Prior Publication Data

US 2005/0075034 A1    Apr. 7, 2005

Related U.S. Application Data

(63) Continuation-in-part of application No. 10/698,778, filed on Oct. 30, 2003, now Pat. No. 6,786,792, which is a continuation of application No. 10/211,444, filed on Aug. 2, 2002, now Pat. No. 6,663,457, which is a continuation-in-part of application No. 09/532,665, filed on Mar. 21, 2000, now abandoned, which is a continuation-in-part of application No. 08/612,385, filed on Mar. 7, 1996, now Pat. No. 6,048,248.

(51) Int. Cl.
    *A63H 33/00*    (2006.01)

(52) U.S. Cl. ............................ 446/71; 446/73; 446/76; 119/702

(58) Field of Classification Search ................ 446/369, 446/370, 371, 373, 71–74
See application file for complete search history.

(56) References Cited

U.S. PATENT DOCUMENTS

| | | | | |
|---|---|---|---|---|
| 2,347,405 A * | 4/1944 | Ford | ......................... | 446/369 |
| 4,763,369 A * | 8/1988 | Spector | ......................... | 5/640 |
| 6,547,633 B1 * | 4/2003 | Haug | ......................... | 446/369 |
| 6,685,532 B1 * | 2/2004 | McLean | ..................... | 446/369 |
| 6,786,792 B1 * | 9/2004 | Ritchey | ...................... | 446/71 |

* cited by examiner

*Primary Examiner*—Kien Nguyen
(74) *Attorney, Agent, or Firm*—Tod R. Nissle, P.C.

(57) ABSTRACT

An animal toy is configured to stimulate at least one sense of an animal during play by said animal. The toy includes a shell formed of a first pliable material and having an interior; a pouch formed of a second pliable material and contained within the shell during play; a play stimulation item wholly contained within the pouch and configured to issue an emission detectable through the pouch and the shell by at least one sense of said animal; an opening formed in said shell for admitting the pouch into said interior and having a margin; a hem formed along the margin; and, a draw string extending through and from the hem to draw the hem closed.

4 Claims, 7 Drawing Sheets

2

METHOD AND APPARATUS FOR REDUCING RISK THAT A CLOSURE ON STUFFED TOY WILL INJURE OR BE DAMAGED BY AN ANIMAL

This application is a continuation-in-part of U.S. patent application Ser. No. 10/698,778, filed 30 Oct. 2003 now U.S. Pat. No. 6,786,792, for "STUFFED TOY WITH REPLACEABLE PLAY-STIMULATION ITEM".

Application Ser. No. 10/698,778 is a continuation of U.S. patent application Ser. No. 10/211,444, filed 2 Aug. 2002 now U.S. Pat. No. 6,663,457, for "STUFFED TOY WITH REMOVABLE PLAY STIMULATION ITEM".

Application Ser. No. 10/211,444 is a continuation-in-part of U.S. patent application Ser. No. 09/532,665, filed Mar. 21, 2000 now abandoned, for "STUFFED TOY WHICH ACCOMMODATES REMOVABLE PLAY-STIMULATION ITEM".

Application Ser. No. 09/523,665 is a continuation-in-part of U.S. patent application Ser. No. 08/612,385, Mar. 7, 1996, now U.S. Pat. No. 6,048,248, issued Apr. 11, 2000, for "APPARATUS FOR HOLDING A QUANTITY OF STUFFING MATERIAL AND METHOD OF ASSEMBLING SAME".

The present invention relates generally to animal toys. In particular, the invention relates to an animal toy with an internal pouch containing at least one item and having a sealable opening that facilitates the insertion and removal of the item, that includes a closure that reduces the risk of injury to an animal, that disguises the closure, that facilitates opening of the closure by the animal's caretaker, and that reduces the likelihood that the animal can damage the closure by chewing.

Animal toys are designed for a variety of uses. For example, pets play with plush toys, stuffed toys, balls, and other toys having innumerable shapes and sizes. Fragrance-filled bags or containers can comprise or be included with animal toys. The containers can house cosmetics or other agents or materials. The aromatic substances in a container can stimulate play by an animal. Cats in particular enjoy playing with toys that contain catnip because of the minty fragrance of the catnip.

Many animal toys are permanently sealed. Catnip toys that are permanently sealed may have to be replaced after the catnip becomes stale. Similarly, permanently sealed toys or containers filled with potpourri or other fragrant material usually are disposed of when they lose their characteristic scents.

Some animal toys provide access to the interior of the toy and permit materials inside the toy to be removed or replaced to extend the life of the toy. For example, some stuffed toys incorporate a zipper, VELCRO fasteners, or other closure devices to facilitate the insertion and removal of materials from the toy. However, zippers, snaps, buttons, and other closure devices are unsightly if visually exposed. Further, if the closure device is exposed or easily manipulated, a toy can be inadvertently or intentionally opened by an animal. Particular limitations associated with conventional VELCRO fasteners are described below in more detail.

Other animal toys utilize asymmetrical patterns and/or bulky closure devices. Such features may make assembly difficult by causing the pattern to pucker, kin, or deform during stitching or other manufacturing processes. In addition, such features may adversely affect the function and appearance of the finished product.

A squeaker or other sound producing device is used in some toys to stimulate or entertain a pet during play. Sound producing devices often contain metal or other hard parts that can pose a danger when an animal plays with the toy. Hard parts can cause a tooth to chip or break. Ingestion of such hard parts can also injure an animal. Another disadvantage of sound producing devices is that they often are readily damaged by an animal during play and become inoperable. This is especially true of a bellows-type squeaker. This type of squeaker is readily punctured by dogs. Still another disadvantage of sound producing devices is that an animal sometimes incessantly repetitively causes the toy to squeak. Incessant squeaking can distract the animal's care giver and result in the toy being taken from the animal.

Some animals intentionally attempt to destroy a toy by chewing it into pieces.

Dog toys with VELCRO fastener closures are especially prone to some of the disadvantages noted above. VELCRO fasteners form a relatively hard area in many toys, particularly when an opening is closed by engaging a hook portion with a loop portion. Some dogs identify this "hard area" as a vulnerable point at which a toy can be opened and penetrated. The dogs then quickly learn to open the VELCRO area with their teeth and paws, after which the dogs remove the contents of the toy. Further, since the hook and loop portions are sewn the fabric comprising the toy, a dog often tears the fabric adjacent the VELCRO fasteners, making the toy unusable and potentially dangerous when the dog shreds both the fabric and the remnants of the VELCRO fasteners.

Another disadvantage of VELCRO fasteners is that the hook and loop material can "catch" on the fur on the face of a dog and cause discomfort when the dog attempts to remove the hook and loop material from contact with the dog's face.

A further disadvantage of VELCRO fasteners is that the hook and loop material can readily scratch a dog's tongue.

Still another disadvantage of VELCRO fasteners is that the hook and loop material can damage the enamel of a dog's teeth.

Still a further disadvantage of VELCRO fasteners is that the hook and loop material can snag on and damage the material used to fabricate a container that is inserted in a toy through an opening in the toy that is bordered by the VELCRO fasteners.

Yet another disadvantage of VELCRO fasteners is that when a toy is fabricated from plush fibers or other material that sheds, the fibers become embedded in the VELCRO fasteners and can make the VELCRO fasteners inoperable.

It would therefore be highly desirable to provide an improved animal toy that would include an improved closure for accessing the interior of the toy, wherein the improved closure would make it difficult for an animal to recognize the location of the closure, would make it difficult for an animal to open the closure, would make it difficult for an animal to damage the closure by chewing, would reduce the likelihood that the animal would injure itself chewing on the closure, and would facilitate inserting objects through the closure (when open) into the interior of the toy.

These and other, further and more specific objects of the invention will be apparent to those skilled in the art from the following detailed description thereof, taken in conjunction with the drawings, in which.

Figure 1:
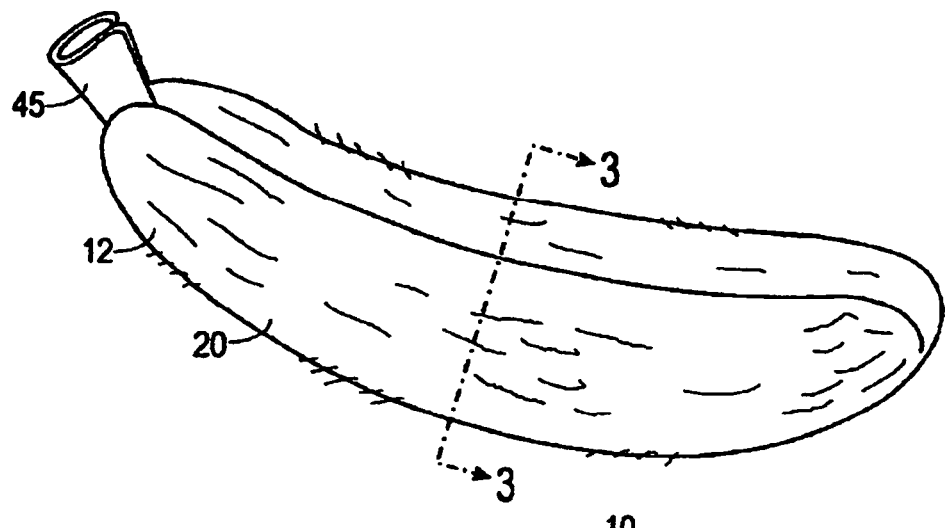
FIG. 1 is a perspective view of a stuffed toy having an opening.

Briefly, in accordance with the invention, I provide an improved stuffed animal toy configured to stimulate at least one sense of an animal during play by the animal. The toy comprises a shell formed of a first pliable material and having an interior; a pouch formed of a second pliable material and contained within the shell during play; a play stimulation item wholly contained within the pouch and configured to issue an emission detectable through the pouch and the shell by at least one sense of the animal; an opening formed in the shell for admitting the pouch into the interior and having a margin; a hem formed along the margin; a draw string extending through and from the hem to draw the hem closed.

In accordance with another embodiment of the invention, I provide an improved an animal toy configured to stimulate at least one sense of an animal during play by the animal. The toy comprises a shell formed of a first pliable material and having an interior; a pouch formed of a second pliable material and contained within the shell during play; a play stimulation item wholly contained within the pouch and configured to issue an emission detectable through the pouch and the shell by at least one sense of the animal; an opening formed in the shell for admitting the pouch into the interior and having a margin; a hem formed along the margin; a draw string extending through and from the hem to draw the hem closed, the draw string having at last one outer end; and, a second opening formed through the shell to receive the outer end when the drawstring draws the hem closed.

In accordance with a further embodiment of the invention, I provide an improved animal toy configured to stimulate at least one sense of an animal during play by the animal. The toy comprises a shell formed of a first pliable material and having an interior; a play article contained within the shell and configured to stimulate at least one sense of the animal; an opening formed in the shell for admitting the play article into the interior and having a margin; a hem formed along the margin; and, a draw string extending through and away from the hem to draw the hem closed.

In still another embodiment of the invention, I provide an improved animal toy configured to stimulate at least one sense of an animal during play by the animal. The toy comprises a shell formed of a first pliable material; an interior in the shell shaped and dimensioned to store a play article, the play article configured to stimulate at least one sense of the animal; an opening formed in the shell for admitting the play article into the interior and having a margin; a hem formed along the margin; a draw string extending through and from the hem to draw the hem closed and constrict the opening.

In still a further embodiment of the invention, I provide an improved animal toy configured to stimulate at least one sense of a dog during play and to reduce the likelihood the dog will damage the tody by chewing on the toy. The toy comprises a shell formed of a first pliable material; an interior in the shell shaped and dimensioned to store a play article, the play article configured to stimulate at least one sense of the animal; an opening formed in the shell for admitting the play article into the interior and having a margin; a hem formed along the margin; a draw string extending through and from the hem to draw the hem closed and constrict the opening, and having at least one outer end, and at least two operative positions, a first position with the outer end outside the interior, and a second position with the outer end extending through the interior.

In yet another embodiment of the invention, I provide an animal toy configured to stimulate at least one sense of a dog during play and to reduce the likelihood the dog will damage the tody by chewing on the toy. The toy comprises a shell formed of a first pliable material; an interior in the shell shaped and dimensioned to store a play article, the play article configured to stimulate at least one sense of the animal; a first opening formed in the shell for admitting the play article into the interior and having a margin; a hem formed along the margin; a draw string extending through the hem and having at least one outer end; a second opening formed through the shell and shaped to slidably receive the outer end of the drawstring; the hem, first opening, and drawstring having at last two operative positions, a first open position with the first opening and hem open to permit the play article to pass therethrough, and a second closed position with the drawstring pulled to close the hem and the first opening, and the outer end extending through the first opening, through the interior, through the second opening and outside the shell.

In yet a further embodiment of the invention, I provide an animal toy configured to stimulate at least one sense of a dog during play and to reduce the likelihood the dog will damage the toy by chewing on the toy. The toy comprises a shell formed of a first pliable material; an interior in the shell shaped and dimensioned to store a play article, the play article configured to stimulate at least one sense of the animal; an opening formed in the shell for admitting the play article into the interior and having a margin; a hem formed along the margin; a draw string extending through the hem and having at least one outer end; the hem, first opening, and drawstring having at last two operative positions, a first open position with the first opening and hem open to permit the play article to pass therethrough, and a second closed position with the drawstring pulled to close the hem and the first opening, and at least a portion of the outer end positioned with respect to the shell and shaped and dimensioned to simulate an anatomical feature of the toy.

In still yet another embodiment of the invention, I provide an improved animal toy configured to stimulate at least one sense of an animal during play by the animal. The toy comprises a shell formed of a first pliable material; an interior in the shell shaped and dimensioned to store a selected material, the material configured to stimulate at least one sense of the animal; an opening formed in the shell for admitting the play article into the interior and having a margin; a hem formed along the margin; and, a draw string extending through and from the hem to draw the hem closed and constrict the opening.

In still yet a further embodiment of the invention, I provide an improved animal toy configured to stimulate at least one sense of a dog during play and to reduce the likelihood the dog will damage the toy by chewing on the toy. The toy comprises a shell formed of a first pliable material; an interior in the shell shaped and dimensioned to store a play article, the play article configured to stimulate at least one sense of the animal; an opening formed in the shell for admitting the play article into the interior and having a margin; a hem formed along the margin and having at least one open end shaped and dimensioned to permit a portion of the draw string to slidably be pulled therethrough to draw the hem closed; a draw string extending through the hem and out the open end and having at least one outer end; the hem, opening, and drawstring having at least two operative positions, a first open position with the first opening and hem open to permit the play article to pass therethrough, and a second closed position with the portion of the drawstring pulled out through the open end to draw the hem closed to close the first opening; the open end being constructed generally to maintain the shape and dimension when the portion of the draw string is slidably pulled through the open end.

In a further embodiment of the invention, I provide an improved method of stimulating at least one sense of an animal during play. The method comprises the step of providing a stuffed animal toy configured to stimulate at least one sense of an animal during play by the animal. The toy comprises a shell formed of a first pliable material and having an interior; a pouch formed of a second pliable material and contained within the shell during play; a play stimulation item wholly contained within the pouch and configured to issue an emission detectable through the pouch and the shell by at least one sense of the animal; an opening formed in the shell for admitting the pouch into the interior and having a margin; a hem formed along the margin; and, a draw string extending through and from the hem to draw the hem closed. The method also includes the step of providing the toy to the animal to play with to stimulate at least one sense of the animal.

In another embodiment of the invention, I provide a method of stimulating at least one sense of an animal during play. The method includes the step of providing an animal toy configured to stimulate at least one sense of an animal during play by the animal. The toy comprises a shell formed of a first pliable material and having an interior; a pouch formed of a second pliable material and contained within the shell during play; a play stimulation item wholly contained within the pouch and configured to issue an emission detectable through the pouch and the shell by at least one sense of the animal; an opening formed in the shell for admitting the pouch into the interior and having a margin; a hem formed along the margin; a draw string extending through and from the hem to draw the hem closed, the draw string having at last one outer end; and, a second opening formed through the shell to receive the outer end when the drawstring draws the hem closed. The method also includes the step of providing the toy to the animal to play with to stimulate at least one sense of the animal.

In still a further embodiment of the invention, I provide a method of stimulating at least one sense of an animal during play. The method includes the step of providing an animal toy configured to stimulate at least one sense of an animal during play by the animal. The toy comprises a shell formed of a first pliable material and having an interior; a play article contained within said shell and configured to stimulate at least one sense of the animal; an opening formed in the shell for admitting the play article into the interior and having a margin; a hem formed along the margin; a draw string extending through and away from the hem to draw the hem closed. The method also includes the step of providing the toy to the animal to play with to stimulate at least one sense of the animal.

In still another embodiment of the invention, I provide an improved method of stimulating at least one sense of an animal during play. The method includes the step of providing an animal toy configured to stimulate at least one sense of an animal during play by the animal. The toy comprises a shell formed of a first pliable material; an interior in the shell shaped and dimensioned to store a play article, the play article configured to stimulate at least one sense of the animal; an opening formed in the shell for admitting the play article into the interior and having a margin; a hem formed along the margin; and, a draw string extending through and from the hem to draw the hem closed and constrict the opening. The method also includes the step of providing the toy to the animal to play with to stimulate at least one sense of the animal.

In yet a further embodiment of the invention, I provide an improved method of stimulating at least one sense of a dog during play and reducing the likelihood the dog will damage the toy by chewing on the toy. The method includes the step of providing an animal toy configured to stimulate at least one sense of a dog during play by the dog. The toy comprises a shell formed of a first pliable material; an interior in the shell shaped and dimensioned to store a play article, the play article configured to stimulate at least one sense of the animal; an opening formed in the shell for admitting the play article into the interior and having a margin; a hem formed along the margin; a draw string extending through and from the hem to draw the hem closed and constrict the opening, and having at least one outer end, and at least two operative positions, a first position with the outer end outside the interior, and a second position with the outer end extending through the interior. The method also includes the step of providing the toy to the dog to play with to stimulate at least one sense of the dog.

In yet another embodiment of the invention, I provide an improved method of stimulating at least one sense of a dog during play and reducing the likelihood the dog will damage the toy by chewing on the toy. The method includes the step of providing an animal toy configured to stimulate at least one sense of a dog during play and to reduce the likelihood the dog will damage the toy by chewing on the toy. The said toy comprises a shell formed of a first pliable material; an interior in the shell shaped and dimensioned to store a play article, the play article configured to stimulate at least one sense of the animal; a first opening formed in the shell for admitting the play article into said interior and having a margin; a hem formed along the margin; a draw string extending through the hem and having at least one outer end; and, a second opening formed through the shell and shaped to slidably receive the outer end of the drawstring. The hem, first opening, and drawstring have at last two operative positions, a first open position with the first opening and hem open to permit the play article to pass therethrough, and a second closed position with the drawstring pulled to close the hem and the first opening, and the outer end extending through the first opening, through the interior, through the second opening and outside the shell. The method also includes the step of providing the toy to the dog to play with to stimulate at least one sense of the animal.

In yet still a further embodiment of the invention, I provide an improved method of stimulating at least one sense of a dog during play and reducing the likelihood the dog will damage the toy by chewing on the toy. The method includes the step of providing an animal toy configured to stimulate at least one sense of a dog during play and to reduce the likelihood the dog will damage the toy by chewing on the toy. The toy comprises a shell formed of a first pliable material; an interior in the shell shaped and dimensioned to store a play article, the play article configured to stimulate at least one sense of the dog; an opening formed in the shell for admitting the play article into the interior and having a margin; a hem formed along the margin; and, a draw string extending through the hem and having at least one outer end. The hem, first opening, and drawstring have at least two operative positions, a first open position with the first opening and hem open to permit said play article to pass therethrough, and a second closed position with the drawstring pulled to close the hem and the first opening, and at least a portion of the outer end positioned with respect to the shell and shaped and dimensioned to simulate an anatomical feature of the toy. The method also includes the step of providing the toy to the dog to play with to stimulate at least one sense of the dog.

In yet still another embodiment of the invention, I provide an improved method of stimulating at least one sense of a dog during play and reducing the likelihood that the dog will damage the toy by chewing the toy. The method includes the step of providing a toy configured to stimulate at least one sense of the dog during play by the dog. The toy comprises a shell formed of a first pliable material; an interior in the shell shaped and dimensioned to store a selected material, the material configured to stimulate at least one sense of the animal; an opening formed in the shell for admitting the play article into the interior and having a margin; a hem formed along the margin; a draw string extending through and from the hem to draw the hem closed and constrict the opening. The method also includes the step of providing the toy to the dog to play with to stimulate at least one sense of the dog.

In a further embodiment of the invention, I provide an improved method of stimulating at least one sense of a dog during play and of reducing the likelihood that the dog will damage the toy by chewing the toy. The method includes the step of providing a dog toy configured to stimulate at least one sense of a dog during play and to reduce the likelihood the dog will damage the toy by chewing on the toy. The toy comprises a shell formed of a first pliable material; an interior in the shell shaped and dimensioned to store a play article, the play article configured to stimulate at least one sense of the dog; an opening formed in the shell for admitting the play article into the interior and having a margin; a hem formed along the margin and having at least one open end shaped and dimensioned to permit a portion of the draw string to slidably be pulled therethrough to draw the hem closed; and, a draw string extending through the hem and out the open end and having at least one outer end. The hem, opening, and drawstring have at least two operative positions, a first open position with the first opening and hem open to permit the play article to pass therethrough; and, a second closed position with the portion of the drawstring pulled out through the open end to draw the hem closed to close the first opening. The open end is constructed generally to maintain the shape and dimension when the portion of the draw string is slidably pulled through said open end. The method also includes the steps of opening the opening and the hem to the first open position; passing the play article through the opening into the toy; pulling slidably the portion of the drawstring through the open end to the closed position to close the hem and the first opening, the open end generally maintaining the shape and dimension when the portion is slidably pulled through the open end. The method also includes the step of providing the toy to the dog to play with to stimulate at least one sense of the dog.

Figure 2:
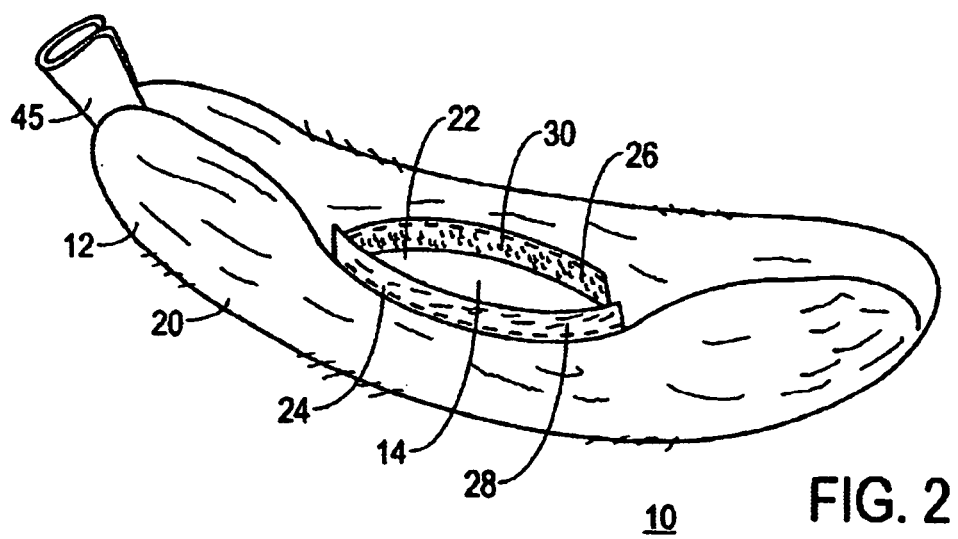
FIG. 2 is a perspective view of the toy of FIG. 1 with its opening unsealed.
Figure 3:
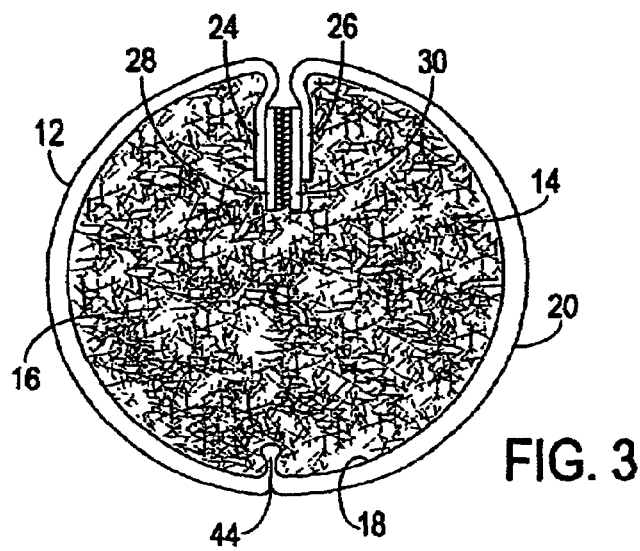
FIG. 3 is a cross sectional view of the toy of FIG. 1 taken along section line 3—3 and showing additional construction details thereof.

Turning now to the drawings, which describe the presently preferred embodiments of the invention for the purpose of illustrating the practice thereof and not by way of limitation of the scope of the invention, and in which like characters refer to corresponding elements throughout the several views, FIGS. 1 and 2 are perspective views of a stuffed toy 10 having a pliable shell 12 with an opening 22 through which stuffing material 16 may be inserted and removed from stuffed toy 10. In FIG. 1, opening 22 is sealed (closed), and in FIG. 2 opening 22 is unsealed (open). FIG. 3 is a cross-sectional view of stuffed toy 10 as viewed from line 3—3. The following discussion refers to FIGS. 1 through 3.

Generally, stuffed toy 10 is configured to hold a quantity of stuffing material 16 such that stuffing material 16 may be inserted and removed as necessary. Stuffed toy 10, as realized in the present invention, may be a fabric toy, a cosmetic dispensing bag, a deodorizing bag (sachet), or any other apparatus that holds a stuffing material.

In FIGS. 1 though 3, stuffed toy 10 is depicted as having the general shape of a banana. Those skilled in the art will appreciate that this is not a requirements of the present invention. The precise shape and size of stuffed toy 10 and the quantity and form of stuffing material may be altered as desired to meet specific applications.

Stuffed toy 10 included pliable shell 12, which is preferably formed with from a washable material. Although stuffed toy 10 is depicted in FIGS. 1 through 3 as a banana-shaped toy, shell 12 may be shaped, colored, and sized to suit individual applications. Shell 12 is hollow and encompasses an interior cavity 14 configured to hold stuffing material 16. As shown in FIG. 3, interior cavity 14 is substantially defined by an inner surface 18 of shell 12. An outer surface 20 of shell 12 may be textured and have an associated nap direction (not shown).

In a first preferred embodiment, stuffed toy 10 is a cat toy and stuffing material 16 is or contains catnip to stimulate play. To enable stuffed toy 10 to release the catnip essence, shell 12 is preferably formed from a relatively porous odor-permeable material.

Shell 12 includes a shell opening 22 formed therein. Opening 22 is configured to provide access to interior cavity 14. Stuffing material 16 is inserted and removed through opening 22. In the preferred embodiment, this allows replacement of stuffing material 16 through opening 22 when stuffing material 16 no longer stimulates play, e.g. when the catnip has become stale and lost its odor.

Surrounding opening 22 are a first flap 24 and a second flap 26. Flaps 24 and 25 may, but need not be, integrally formed in shell 12. As shown in FIG. 2, flaps 24 and 26 are each adjacent opening 22 and are located on opposite sides of opening 22. Nothing requires flaps 24 and 26 to be configured as shown. For example, flaps 24 and 26 may be blended into shell 12 without having noticeable edges or corners.

A first sealing element 28 is coupled to first flap 24 and a second sealing element 30 is coupled to second flap 26 (see FIG. 3). Sealing elements 28 and 30 are coupled to outer surface 20 of shell 12 and are configured to releasably seal opening 22. Opening 22 is effectively sealed when sealing elements 28 and 30 engage one another. According to the preferred embodiment, sealing elements 28 and 30 are cooperating strips of a conventional hook-and-loop fastener. Of course, stuffed toy 10 may employ other suitable sealing components, such as snaps or adhesive strips.

Flaps 24 and 26 and sealing elements 28 and 30 are preferably configured such that flaps 24 and 26 extend into interior cavity 14 when opening 22 is sealed. This preferred sealing arrangement is shown in FIG. 3. As described above, first and second sealing elements 28 and 30 are coupled to outer surface 20 of first and second flaps 24 and 26, respectively. Thus, flaps 24 and 26 are folded inward within interior cavity 14 and sealing elements 28 and 30 are engaged to seal opening 22. Consequently, flaps 24 and 26 and sealing elements 28 and 30 are located substantially within interior cavity 14 when opening 22 is sealed. When sealed properly, flaps 24 and 26 and sealing elements 28 and 30 are hidden from view, which enhances the appearance of stuffed toy 10 and reduces the likelihood that stuffed toy 10 will be accidently opened.

To promote efficient sealing of opening 22, the lengths of opening 22, flaps 24 and 26, and sealing elements 28 and 30 are approximately equal. This configuration reduces leakage of stuffing material 16 from the ends of opening 22.

Figure 4:
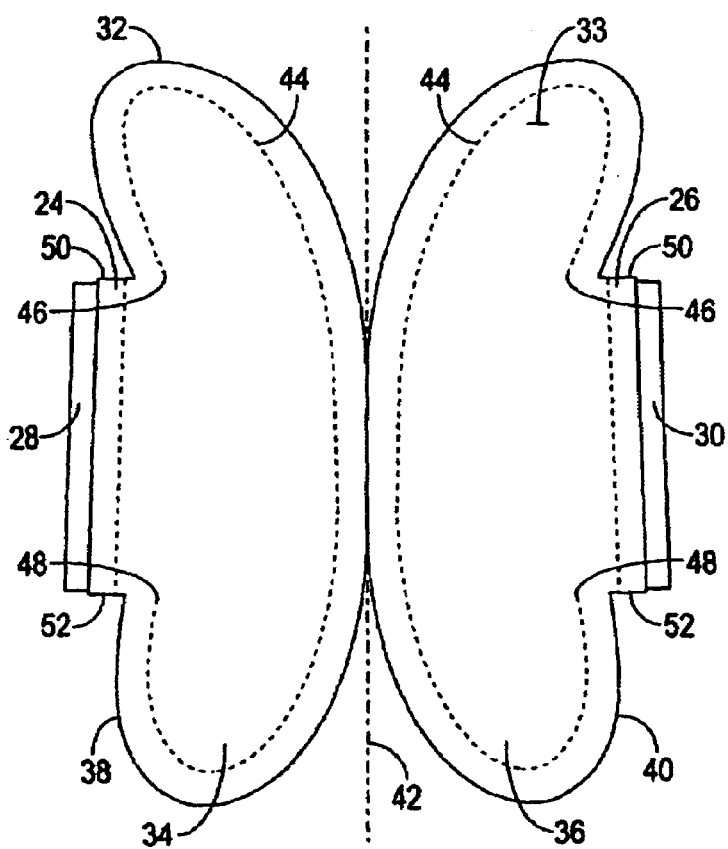
FIG. 4 is a top view of a pattern used to construct the toy of FIG. 1.

FIG. 4 shows a top view of a pattern 32 used to construct stuffed toy 10. The following discussion refers to FIGS. 1 through 4.

An inner side 33 of pattern 32 is shown face-up and a corresponding outer side is hidden from view. Shell 12 is preferably formed from pattern 32, which includes a first portion 34 and a substantially symmetrical second portion 36. First portion 34 has a first perimeter 38 and second portion 36 has a second perimeter 40. Pattern 32 is cut to form first and second flaps 24 and 26, which are located on first and second portions 34 and 36, respectively. In the preferred embodiment, flaps 24 and 26 extend approximately ¼ inch beyond the sections of pattern 32 that form the body of stuffed toy 10.

In accordance with a preferred method of construction, sealing elements 28 and 30 are coupled to pattern 32 before shell 12 is formed. For example, first and second sealing elements 28 and 30 may be sewn onto first and second flaps 24 and 26, respectively. Sealing elements 28 and 30 are coupled to the outer surface of pattern 32 such that their sealing surfaces (e.g., the hook and loop surfaces) are relatively continuous with the outer surface of pattern 32. As such, the sealing surfaces are hidden from view in FIG. 4. To ensure that opening 22 seals in a desirable manner, first and second sealing elements 28 and 30 preferably extend beyond the respective longitudinal edges of flaps 24 and 26, as shown in FIG. 3.

After first and second sealing elements 28 and 30 are attached to first and second flaps 24 and 26, respectively, pattern 32 is folded along a line 42 such that the outer sides of first and second portions 34 and 36 face one another. It should be appreciated that nothing requires pattern 32 to be formed from a single piece of material, e.g., shell 12 may be formed from two separate portions. First and second perimeters 38 and 40 are substantially aligned after pattern 32 is folded along line 42. Sealing elements 28 and 30 may be engaged to maintain the alignment of flaps 24 and 26 during the formation of a seam 44 that couples first and second portions 34 and 36 together.

Seam 44 is depicted as a dashed line in FIG. 4. Seam 44 is formed with the outer sides of portions 34 and 36 facing one another. In the preferred embodiment, seam 44 is formed by stitching around the perimeter of pattern 32. Labels, decorative elements (such as a banana stem 45), and/or other accessories may be added to shell 12 while seam 44 is formed. Seam 44 is partially formed around the perimeter, i.e. seam 44 is discontinuous at opening 22 (see FIG. 2). In the preferred embodiment, the distance that seam 44 is offset from the edge of pattern 32 is approximately the same as the distance that flaps 24 and 26 extend beyond the edge of pattern 32. In other words, approximately ¼ inch of material remains between seam 44 and the edge of pattern 32.

Seam 44 has a first end 46 and a second end 48 that cooperate to define opening 22. In accordance with the preferred embodiment, first and second flaps of 24 and 26 each have a first edge 50 and a second edge 52 that are substantially aligned with first and second seam ends 46 and 48, respectively. In other words, an imaginary line extends from first flap edge 50 and approximately intersects a point defined by first seam end 46. Similarly, an imaginary line extended from a second flap edge 52 approximately intersects a point defined by second seam end 48.

In an alternative embodiment (not shown) where flaps 24 and 26 are blended into pattern 32, flaps 24 and 26 do not have noticeable edges equivalent to first and second edges 50 and 52 described above. In such an embodiment, first and second sealing elements 28 and 30 may have edges that are substantially aligned with first and second seam ends 46 and 48.

First and second seam ends 46 and 48 are formed with an increased displacement from the perimeter of shell 12 at opening 22. In other words, the distance between the perimeter and seam 44 is greater at seam ends 46 and 48 than at the remaining portions of shell 12.

The preferred relationship between seam ends 46 and 48 and flap edges 50 and 52 enables opening 22 to be effectively sealed after stuffed toy 10 is filled with stuffing material 16. In additional, the construction of seam 44 reduces puckering and kinking of shell 12 during assembly, packaging, and display of stuffed toy 10.

After seam 44 is formed, shell 12 is in an inside-out state. Subsequently, shell 12 may be manipulated such that the inner sides of first and second portions 35 and 36 face one another. In other words, shell 12 is turned right side out (as shown in FIG. 2). If desired, shell 12 may be subsequently filled with stuffing material 16.

To seal opening 22, first and second flaps of 24 and 26 are preferable folded inward such that they extend within interior cavity 14 (see FIG. 3). In FIG. 2, first flap 24 is in an unfolded position with first sealing element 28 facing outward, and second flap 26 is in a folded position with second sealing element 30 extending into interior cavity 14. In the folded positions, flaps 24 and 26 may be sealed together by engaging first and second sealing elements 28 and 30. As shown in FIG. 1, sealing elements 28 and 30 are preferably hidden from view when opening 22 is sealed. Because sealing elements 28 and 30 may be separated and resealed, stuffing material 16 may be easily removed to facilitate washing of shell 12. In addition, an aromatic stuffing material 16, such as catnip, may be replenished after it has become stale.

Figure 5:
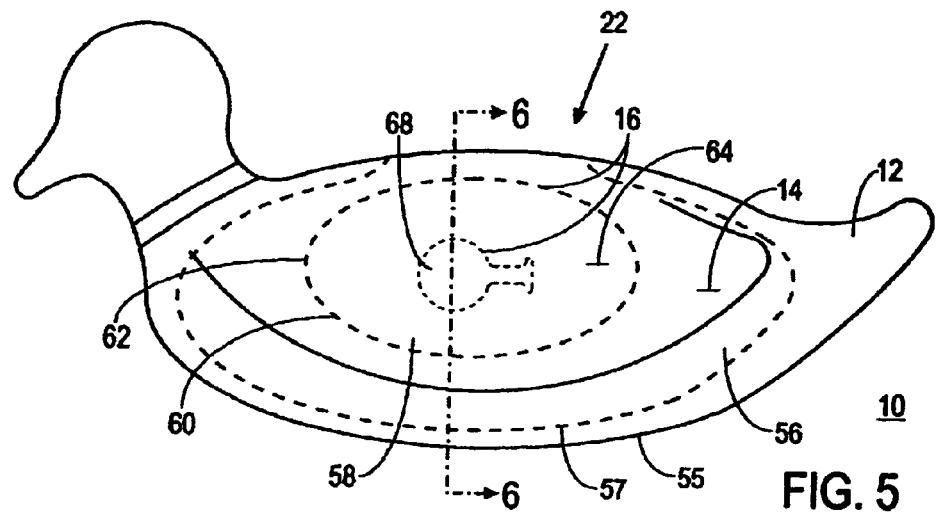
FIG. 5 is a side view of a stuffed toy in the shape of a duck.
Figure 6:
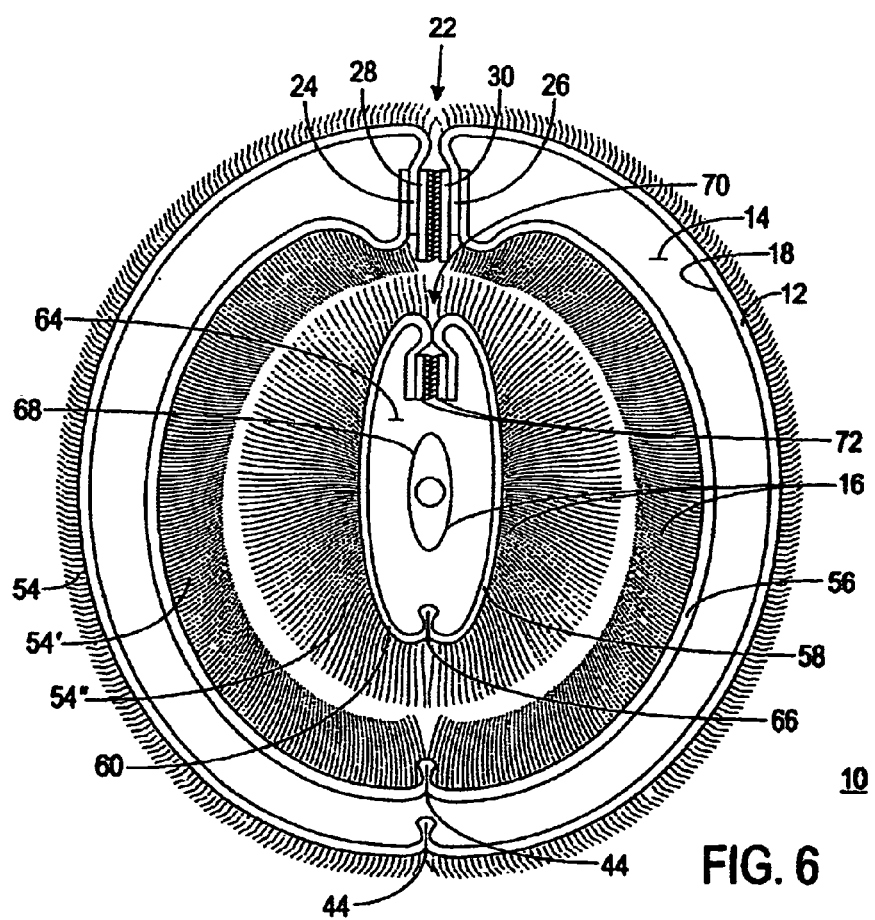
FIG. 6 is a cross sectional view of the toy of FIG. 5 taken along section line 6—6.

FIG. 5 shows a side view and FIG. 6 shows a cross sectional view of stuffed toy 10 having the shape of a duckling. The following discussion refers to FIGS. 1 through 6.

In another preferred embodiment of stuffed toy 10, it is desirable that stuffed toy 10 be configured to inhibit stuffing material 16 from release through tears in pliable shell 12. Such tears may occur when an animal bites or chews toy 10. Desirably, inhibiting the release of stuffing material is accomplished by configuring stuffed toy 10 so as to eliminate the use of loose filler material as stuffing material 16.

Pliable shell 12 of toy 10 may be formed of a fur 54 (FIGS. 5 and 6). For the purpose of the present invention, "fur" shall be taken to include, but not be limited to, natural and synthetic furs and fur-like materials, e.g. real and faux animal skins, pelts, fabrics, sheepskins, etc. Furs are different from other flexible sheet materials in that they have a nap (hair, wool, fiber, etc.) attached to an underlayer (skin, fabric, etc.). This provides a significant increase in both bulk and penetration resistance over the underlayer material along.

Additionally, flaps 24 and 26 (FIGS. 3 and 4) may be extended, expanded, and sewn to become an inner pliable shell (a liner) 56 within outer pliable shell 12. Inner pliable shell 56 significantly increases the resistance to dental penetration of toy 10 by providing an additional layer of material. Forming inner pliable shell 56 of a fur 54' also increases bulk. This additional increase in bulk permits a further reduction in the amount of loose filler material required as stuffing material 16 to achieve a given bulk of toy 10.

When formed of fur 54', inner shell 56 may serve as stuffing material 16 in lieu of a loose filler material (such as kapok or polyester fiberfill). This provides an advantage in that, should outer shell 12 be penetrated, stuffing material 16 will not be released as strands and clumps that may be ingested and/or create a mess.

Those skilled in the art will appreciate that fur 54 used to form outer shell 12 may or may not be the same as fur 54' used to form inner shell 56. It may be desirable to utilize only a single type of fur for both fur 54 and fur 54', e.g., to minimize production costs. On the other hand, it may be desirable that fur 54 be different from fur 54', e.g, fur 54 may be chosen for appearance, while fur 54' may be chosen for bulk. For example, fur 54 may be a short-napped synthetic leopard skin for appearance, while fur 54' may be a long-napped synthetic sheepskin for bulk.

When flaps 24 and 26 are extended to become inner pliable shell 56, a perimeter 55 of outer pliable shell 12 and a perimeter 57 of inner pliable shell 56 are sewn via a plurality of seams 44 so as to form interior cavity 14 within inner pliable shell 56, i.e., within both outer and inner pliable shells 12 and 56, while having a single shell opening 22 through both shells 12 and 56 into cavity 14. First and second sealing elements 28 and 30 of the hook-and-loop fastener are affixed to inner surface 18 of inner shell 56 in positions analogous to the positions they would occupy were flaps 24 and 26 not extended. That is, first sealing element (one of hook or loop part) 28 is affixed to inner surface (inside) 18 of inner pliable shell 56 at a first location proximate opening 22 in opposition to first sealing element 28. First and second locations are such that first sealing element 28 is configured to releasably engage second sealing element 30.

Whether or not flaps 24 and 26 are extended into inner shell 56, an internal pouch 58 is desirably used as additional stuffing material 16. Pouch 58 may also be formed of a fur 54". Those skilled in the art will appreciate that fur 54" used to form pouch 58 may or may not be the same as fur 54 used to form outer shell 12 and/or fur 54' used to form inner shell 56. It may be desirable to utilize only a single type of fur for all furs, 54, 54', and 54". On the other hand, it may be desirable that two or even three different types of fur be used for furs 54, 54', and 54".

In the preferred embodiment of FIGS. 5 and 6, pouch 58 is formed of a pliable pouch shell 60 having a perimeter 62 and forming cavity 64. Perimeter 62 is desirably formed to substantially confirm to perimeter 57 of inner shell 56, thereby spreading the bulk of pouch 58 throughout interior cavity 14.

If cavity 64 is to be sealed, a seam 66 is formed around perimeter 62 and closes pouch 58, entrapping play-stimulation item 68 within cavity 64.

If cavity 64 is to be accessible, seam 66 is partially formed around perimeter 62, thereby defining an opening 70 into cavity 64. A fastener 72 releasably closes opening 70 to entrap contents in cavity 64.

Whether cavity 64 is sealed or accessible, pouch 58 and play-stimulation item 68 (i.e., the contents of cavity 64) together serve as stuffing material 16 for toy 10. Desirably, outer pliable shell 12, inner pliable shell 56, and pliable pouch shell 60 are forms of furs 54, 54', and 54", respectively, selected to provide sufficient bulk to eliminate the need for a loose filler material such as kapok or polyester filberfill, as stuffing material 16.

Play-stimulation item 68 is desirably configured to issue an emission to provide stimulation of one or more senses of the animal. Play-stimulation item 68 may be olfactory-excitation material, such as catnip, in which case the emission issued is a scent or odor. That is, pouch 58 may be configured as a catnip cachet, the scent of which provides stimulation to the sense of smell of the animal and encourages play with stuffed toy 10. When play-stimulation item 68 is exhausted, e.g., when the oils and other essences have dried in the catnip and insufficient scent remains, play-stimulation item 68 may fail to stimulate play. In this case, a new pouch 58 containing a fresh play-stimulation item 68 (fresh catnip) may replace the exhausted pouch 58 to restore play stimulation.

Play-stimulation item 68 in pouch 58 may be a sound-producing device, such as a mechanical or electronic squeaker, in which case the emission issued is a sound that provides stimulation to the sense of hearing of the animal and encourages play with stuffed toy 10. When play-stimulation item 68 is exhausted, e.g., when it has become damaged, when its batteries have died, or when it is otherwise rendered incapable of producing sufficient sound, pouch 58 containing the exhausted play-stimulation item 68 may be removed and a new pouch 58 containing a fresh play-stimulation item 68 (e.g., an unbroken mechanical squeaker or an electronic squeaker with new batteries) may be inserted to restore play stimulation.

Since, during play, play stimulation item 68 is located inside pouch 58, since pouch 58 is located inside inner shell 56, and since inner shell 56 is located inside outer shell 12, play-stimulation item 68 is invisible to the animal. Play-stimulation item 68 is out of sight of the animal and is well protected by shells 12 and 56 and pouch 58. The animal has no direct access to play-stimulation item 68.

In summary, one embodiment of the present invention provides a stuffed toy 10 containing a replaceable play-stimulation item 68. Through the use of multiple layers, stuffed toy 10 is configured without loose stuffing material 16, and is thereby made resistant to the spillage of stuffing material 16 during active play. Stuffed toy 10 contains an internal pouch 58 inside of which is located a play-stimulation item 68 (e.g. catnip and/or a squeaker). Stuffed toy 10 has a sealable opening 22 through which pouch 58 may be inserted to restore play-stimulation as desired.

Although the preferred embodiments of the invention have been illustrated in detail, it will be readily apparent to those skilled in the art that the various modifications may be made therein without departing from the spirit of the invention or from the scope of the appended claims.

A further embodiment of the invention is depicted in FIGS. 7 to 10 and comprises an animal toy generally indicated by reference character 75. The animal toy 75 has an outer shell 75C that defines the outer appearance and shape of toy 75. Shell 75C simulates an animal and includes head 75E, arms 75F and 75G, legs 75H and 75I, stomach or frontal area 75B, and bottom 75A. Toy 75 also includes an interior 76 shaped and dimensioned to receive a play article 77 or other article or material. If desired, toy 75 can include stuffing that is used to fill all or a portion of interior 76 and/or that is used as fill cavities other than interior 76 that exist in shell. Interior 76 can have a generally fixed shape and dimension when, for example, the portion of animal toy 75 circumscribing interior 76 is rigid and generally retains a fixed shape. Or, interior 76 can have a shape and dimension that varies. One example of an interior with a variable shape occurs when, the shell 75C is pliable and is not rigid and tends to collapse on and "close" interior 76 until a play article 77 is inserted in interior 76 and expands interior 76 by outwardly displacing shell 75C.

Shell 75C includes an opening 100 that provides access to interior 76. Opening 100 is circumscribed by material defining a margin or edge 75D. A hollow generally cylindrically shaped hem 80 is stitched or otherwise connected to margin 75D. Hem 80 includes closed end 80B and open end 80A. Cylindrical, hollow sleeve 85 is attached to margin 75D or to hem 80 adjacent end 80A. Sleeve 85 can be a particular color, shape, or texture to differentiate sleeve 85 from hem 80 such that a user can readily determine the location of end 80A and sleeve 85 visually or using one of his or her other physical senses. If end 80B is open to permit drawstring 81 to slide therethrough, a similar sleeve 85 can be used adjacent end 80B.

Drawstring 81 extends through hem 80. Drawstring 81 includes a first end 82 permanently attached to margin 75D or hem 80 in fixed position inside closed end 80B, includes a second end 83 that extends outside of hem 80 and away from open end 80A and sleeve 85, and includes an intermediate portion 84 that is inside hem 80 and extends between ends 82 and 83.

Figure 8:
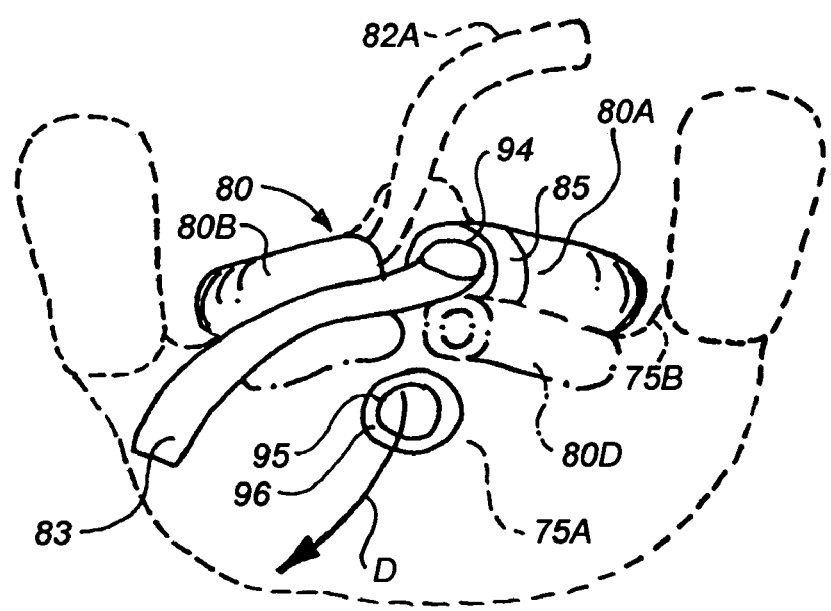
FIG. 8 is a bottom view of the toy of FIG. 7 illustrating the mode of operation thereof.

If desired, end 80B of hem 80 can be open, and end 82 need not be fixed and can instead slidably movably extend through and outwardly from open end 80B in the manner indicated by dashed lines 82A in FIG. 8. In this alternate configuration, either free end 82A, 83 can be utilized to pull slidably drawstring 81 through hem 80 and out through ends 80B and 80A, respectively.

Drawstring 81 can be fabricated from any desired material, including rope, twine, cloth, plastic, wire, etc. It is preferred, however, that the drawstring 81 consist of a pliable, soft material that normally will not damage or injure the teeth or gums or body of an animal playing with the toy. Similarly, hem 80 can be fabricated from any desired material. It is preferred, however, that the hem 80 be fabricated from a pliable soft material that will fold and permit the diameter or width of hem 80 to constrict when drawstring 81 is used to draw hem 80 closed in order to close opening 100. Hem 80 typically is made from a soft fabric that normally will not damage or injure the teeth or gums or body of an animal.

Figure 7:
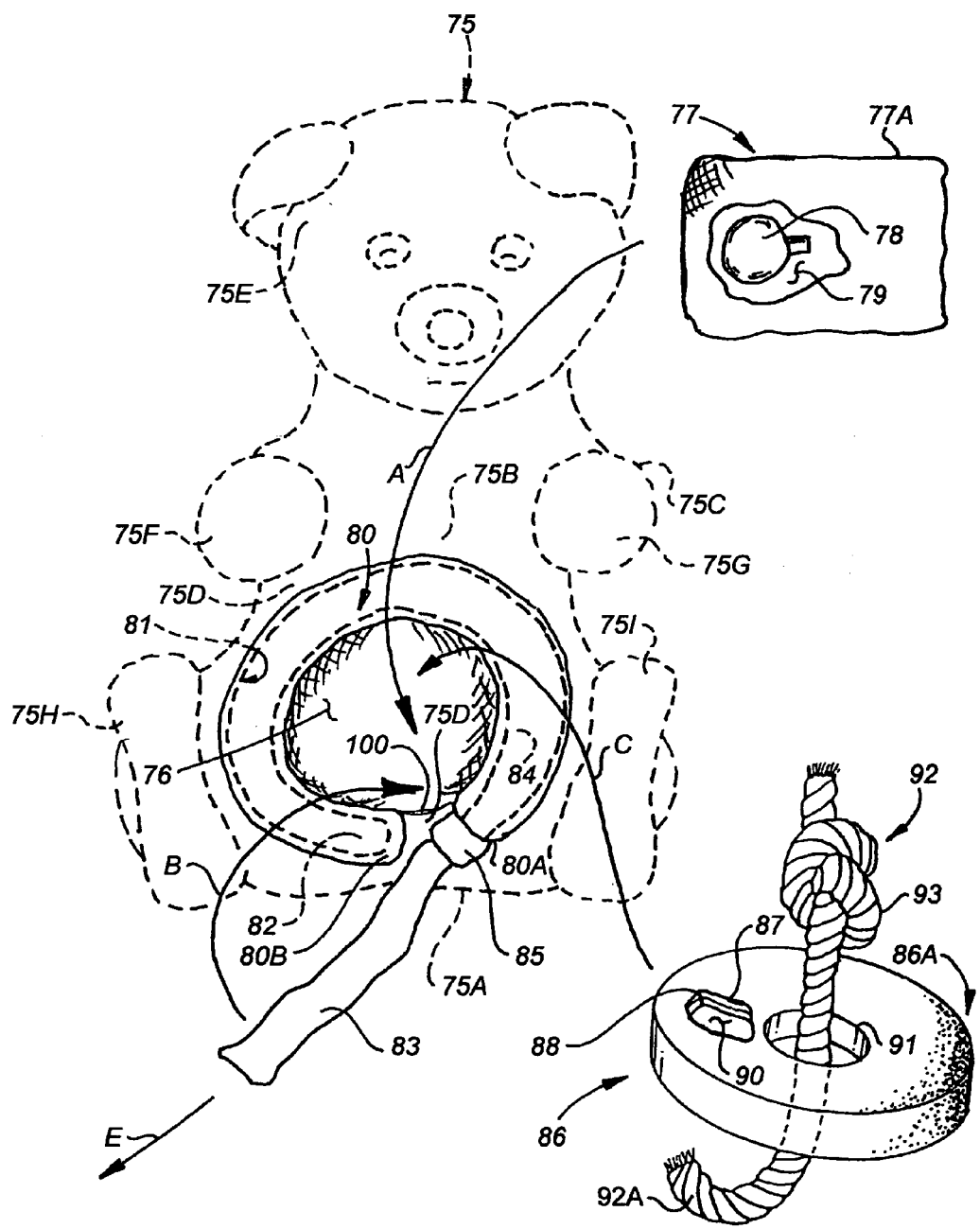
FIG. 7 is a front elevation view illustrating a toy constructed in accordance with an alternate embodiment of the invention.

Hem 80 need not comprise the continuous sleeve or channel illustrated in FIG. 7, but can consist of spaced apart segments (like the belt loops around the waist of a pair of pants) that function, as does the hem 80 illustrated in FIG. 7, to guide drawstring 81 around opening 100 and to draw opening 100 closed when end 83 (or ends 82A and 83) is pulled outwardly away from end 80A (or ends 80A and 80B) to constrict hem 80.

The inner diameter or width of hem 80 with respect to the diameter or width of drawstring 81 can vary as desired. The inner width of hem 80 typically is equal to or greater than the width of drawstring 81, simply to permit drawstring 81 to be pulled through hem 80. It is, of course, possible that drawstring 81 may be wider than the inner width of hem 80, but that drawstring 81 can be folded (as in the case of ribbon) or compressed (as in the case of foam) so that it will fit in and can be slidably drawn through the inside of hem 80. Drawstring 81 is preferably, but not necessarily, made from a material that tends not to frictionally bind with or stick to the inner surface of hem 80, this so drawstring 81 will smoothly slide through hem 80 with minimal frictional resistance. The width and shape and dimension of drawstring 81 can vary as desired. The width and shape and dimension of hem 80 can vary as desired.

A particular problem that can be encountered with respect to hem 80 and drawstring 81 is that when an attempt is made to pull end 83 (or ends 82A and 83) outwardly away from ends 80A and 80B to constrict hem 80 and opening 100, intermediate portion 84 binds inside hem 80 and is not readily pulled free from hem 80. Various attempts can be made to ameliorate this problem the making the opening 94 larger, by changing the shape of opening 94, or by making the inner width of hem 80 larger with respect to the external width of drawstring portion 84. Such attempts often do not solve the problem of drawstring portion 84 binding to hem 80. Instead, it is believed important to fabricate or reinforce opening 94 (or a comparable opening at end 80A in the event sleeve 85 is not utilized) such that when end 83 is pulled outwardly in the direction of arrow E, opening 94 generally maintains its original shape and dimension. If opening 94 is not reinforced or made to maintains it shape, then when end 83 is pulled in the direction of arrow E, opening 94 tends to collapse on and frictionally engage end 83. Therefore, for example, if opening 94 is circular and has a particular diameter, opening 94 is presently preferably fabricated from a stiffer material or from multiple layers of material such that opening 94 generally maintains its circular shape and its diameter when end 83 is pulled in the direction of arrow E (FIG. 7) to shorten the length of drawstring 81 that is in hem 80 and to constrict hem 80 to close opening 100.

The shape and dimension of margin 75D can vary as desired.

In FIGS. 7 to 10, hem 80 is stitched or otherwise fastened to the margin 75D on the outside of shell 75C. If desired, hem 80 can be stitched or fastened to margin 75D on the inside of shell 75C, as indicated by dashed lines 80D in FIG. 8. Or, a portion of hem 80 can extend over margin 75D on the outside of shell 75C and a portion of hem 80 can extend over margin 75D on the inside of shell 75C.

Shell 75C is fabricated from a material that has sufficient give, pliability, elasticity, and/or flexibility to permit shell 75C to be stretched, pulled, squeezed, compressed, or otherwise changed in shape such that opening 100 can be constricted and at least partially closed, preferably completely closed, when end 83 is pulled a sufficient distance outwardly in the direction of arrow E.

Shell 75C can have any desired shape and dimension, but presently preferably is made to resemble an animal or some other living thing, or, to resemble an object preferred by a particular animal, e.g., shell 75C can, for dogs, resemble a bone or ball.

The article placed in the interior of shell 75C can be a play article 86, can be an article 77 that emits a sound, light, or smell, etc.; can be an article or material that is detectable by at least one sense of an animal such as smell, hearing, sight, touch; can be stuffing; or, can be any other desired article(s) or material(s). Article 77 comprises a pouch having an interior 79. Squeaker 78 is housed in the interior 79 of the pouch. When a dog squeezes the pouch and squeaker 78 with his or her mouth, the squeaker emits a noise detectable by the animal's sense of hearing. Article 77 can be inside of or outside of shell 75C when squeezed by a dog's mouth. When article 77 is to be placed in interior 76 of shell 75C, shell 75C is, in one embodiment of the invention, sufficiently soft or pliable or thin to permit a dog or other animal to squeeze article 77 with its mouth or paw by squeezing shell 75C and article 77 inside of shell 75C at the same time.

Article 86 is another example of an article that can be placed inside shell 75. Article 86 includes a doughnut 86A having an aperture 91 formed therethrough and includes a length of rope 92 having a knot 93 formed therein. The knot 93 is too large to fit through aperture 91 and accordingly permits a user to grasp the end 92A and throw simultaneously the doughnut and the rope 92. The doughnut includes an inner sealed space 90 completely sealingly circumscribed and enclosed by a wall 88 fabricated of rubber or some other material. An opening can be formed in doughnut 86A through layer 87 and wall 88 so that space 90 is not completely sealed. A layer 87 of felt or some other fabric or material is formed on or attached to the outer surface of wall 88. A felt made from soft natural fibers like cotton is preferred because it is less likely to scratch or damage an animal's teeth or gums than some other natural or artificial fibers. Pouch 77A can similarly be fabricated from felt or some other material. Article 86 can be placed inside shell 75 after rope 92 is removed from article 86 and is left outside of shell 75. Rope 92 can be placed in side shell 75 after article 86 is separated from rope 92 and is left outside of shell 75. When article 86 is separated from rope 92 and is outside of and separate from shell 75 and toy 100, article 86 can be given to an animal or can be thrown without rope 92. Or, when rope 92 is separated from article 86 and is outside of and separate from shell 75 and toy 100, rope 92 can be given to an animal or can be thrown without article 86. A squeaker 78 can be integrated in article 86 such that squeaker 78 will produce sound audible to a dog or other animal when article 86 is compressed to force air outwardly or inwardly through the squeaker 78. The squeaker can be inserted in the exterior wall 88 of article 86 or can be mounted inside of wall 88 and I the interior 90 of article 86.

In use of the animal toy of FIG. 7, an article 77, 86 or a desired material(s) is inserted through opening 100 into interior 76. End 83 of drawstring 81 is grasped, is inserted in interior 76 in the manner indicated by arrow B, is threaded through and out opening 95 in the manner indicated by arrow D in FIG. 8, and is pulled further in the direction indicated by arrow D to constrict and draw closed (completely or partially, as desired) hem 80 and opening 100 by pulling a section of intermediate portion 84 slidably out through end 80A, out through sleeve 85, and into interior 76. When end 83 is pulled in the direction of arrow D to close opening 100, a section of portion 84 may be pulled from interior 76 out through opening 95 to a position on the exterior of shell 75C. In order to return from the toy configuration of FIGS. 9 and 10 to the toy configuration of FIGS. 7 and 8, the user inserts fingers through the center of closed hem 80 and repeatedly pulls outwardly in order to widen hem 8 and gradually draw a portion of drawstring 81 back into hem 80 until the hem 80 is in the open configuration of FIGS. 7 and 8. Once hem 80 is in the open configuration of FIGS. 7 and 8, end 83 can, if desired, be pulled outwardly from interior 76 to the position illustrated in FIG. 7.

Figure 9:
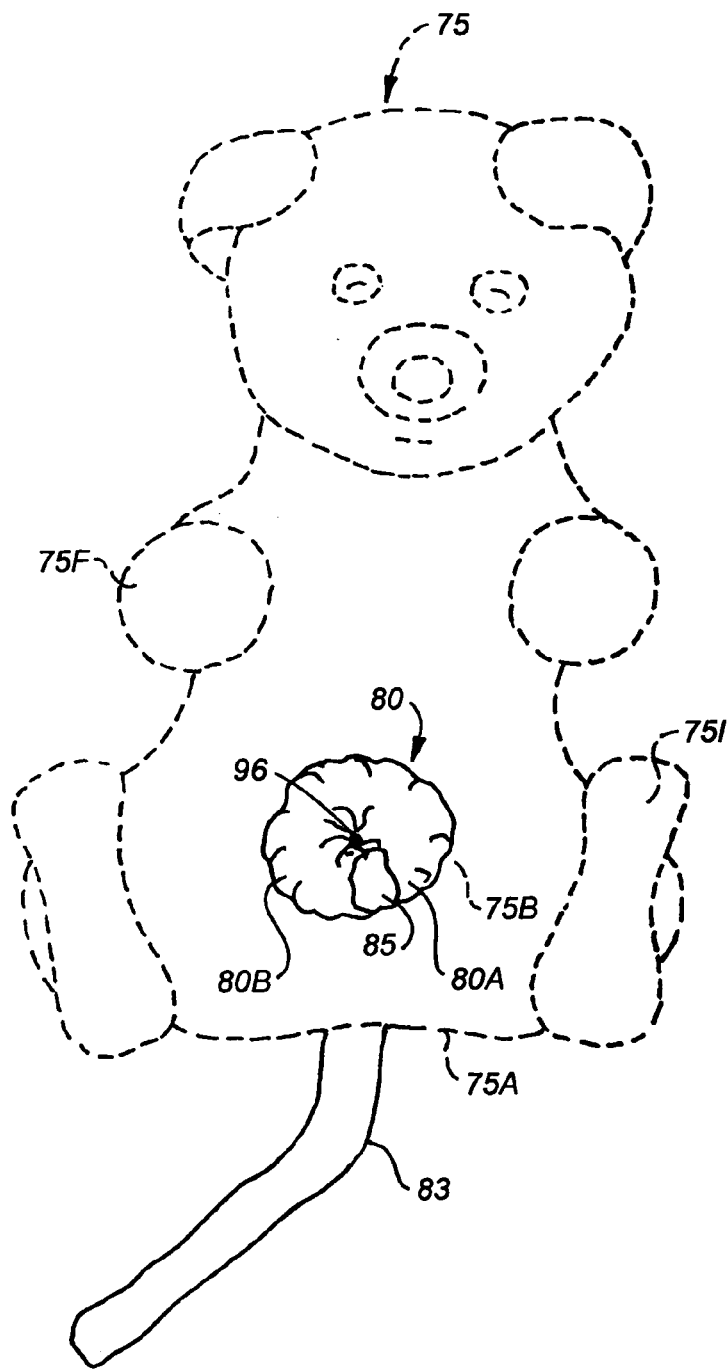
FIG. 9 is a front elevation view of the toy of FIG. 7 illustrating the mode of operation thereof.
Figure 10:
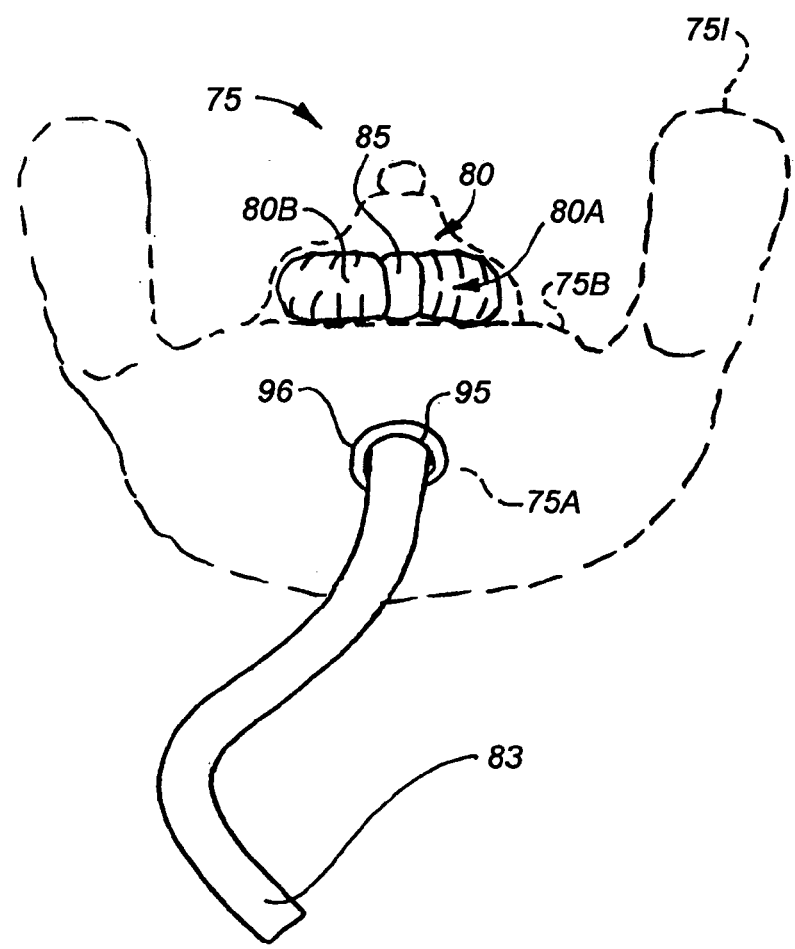
FIG. 10 is a bottom view of the toy of FIG. 7 further illustrating the mode of operation thereof.

The configuration of toy 75 of FIGS. 9 and 10 has several advantages.

One advantage of toy 75 is that after opening 100 is closed by pulling end 83 outwardly away from shell 75C in the manner described, there normally will be part of intermediate portion 84 that extends from sleeve 85 (or from end 80A if sleeve 85 is not utilized), through opening 100, and through interior 76 to or toward opening 95. This part of intermediate portion 84 extending through interior 76 is beneficial because if a dog chews off the part of the drawstring that extends outwardly away from opening 95 and shell 75C, the part of portion 84 inside of shell 75C and in interior 76 functions to maintain opening 100 closed.

A second advantage of toy 75 is that in FIGS. 9 and 10, the drawstring 81, in addition to functioning to close opening 100, functions as an anatomical feature of the toy because end 83 (and a part, if any, of intermediate portion 84 extending outwardly from opening 95) is the tail of the toy. End 83 could, as would be appreciated by those of skill in the art, function as a variety of different anatomical features depending in part on where in shell 75C opening 95 is formed. For example, end 83 can function as a tongue (if opening 95 is formed in the mouth area of the toy 75), as a pigtail (if opening 95 is formed in the head of the toy 75), as a leg, as an arm, etc. In one embodiment of the invention, aperture 95 is not formed in shell 75 and end 83 simply extends outwardly from sleeve 85 and/or end 80A and still functions as the tail of the toy. End 83 can, if desired, not function as an anatomical feature but can instead function as an article of clothing on the toy or as some other aesthetic feature of toy 75. When drawstring 81 has a pair 82A, 83 of free ends (i.e., when end 82A is not fixedly secured in place in hem 80), both ends can be positioned on toy 75 such that they can be tied together to make an aesthetic feature comprising a bow tie. A single free end 83 can also function as a bow-tie or neck tie when positioned at the neck of a toy 75. A pair 82A, 83 of free ends can also function as anatomical features like, for example, a pair of pigtails on the head of a toy 75. Or, if there are a pair of openings 100 (each with its own hem 80) formed in a toy 75 and each opening 100 has at least a single drawstring end 83, then the end 83 from both openings can be utilized together in the manner described to produce an anatomical feature like braids or an aesthetic feature like a bow tie on toy 75.

A third advantage of toy 75 is that in FIGS. 9 and 10 the visible portion of drawstring 81 is kept away from opening 100. This tends to disguise the location of opening 100 and to reduce the likelihood that a dog or other animal will identify or focus on opening 100 and hem 80. Preliminary experimentation has verified this. A toy with a drawstring 81-hem 80-opening 100-opening 95 construction and configuration similar to that of FIGS. 9 and 10 was given to a Brussel Griffon dog that on repeated prior occasions immediately chewed off the exposed part of drawstring 81 when the exposed part of drawstring 81 extended outwardly directly from sleeve 85 or end 80A of a toy. Further, on repeated prior occasions the same dog had been given toys with openings 100 that were provided with VELCRO fastener closures. The dog always chewed open the VELCRO closures to open opening 100 and to remove a play article or other material from the interior 76 of the toy. In contrast, when the toy of FIGS. 9 and 10 was provided the dog, the dog did not immediately chew off the "tail" (i.e., did not chew off end 83) and did not chew on hem 80 or around closed opening 100. The dog ignored these areas of the toy. After five day, the dog was still playing with the toy and the end 83 and remainder of the toy were intact.

A fourth advantage of toy 75 is that when toy 75 is in the configuration illustrated in FIGS. 9 and 10, end 83 can be protected by either pushing most of end 83 down through the center of constricted hem 80 and constricted opening 100 into toy 75, in which case there is only a short exposed length of end 83 that extends on the exterior of shell 75C from opening 95 to constricted opening 100. Alternatively, the entire exposed length of end 83 can, after drawstring 81 is used to close hem 80 and opening 100, be pushed through opening 95 completely into interior 76. Or, end 83 can simply be pulled in the direction of arrow E in FIG. 7 to close hem 80 and opening 100, and substantially the entire exposed length of end 83 can be stuffed through the center of closed hem 80 and opening 100 into interior 76.

A fifth advantage of the toy 75 in FIGS. 9 and 10 is that toy 75 can be readily opened and closed by a consumer to remove from interior 76 the contents of the toy 75 or to insert a play article or other material in interior 76. Unlike a closure made with VELCRO fastening material, hem 80 will not snag on and damage felt, plush fur, and other fabrics found on articles inserted through opening 100 into interior 76.

A sixth advantage of the toy 75 in FIGS. 9 and 10 is that hem 80 and drawstring 81 can be made from soft materials. Dogs are less likely to chew soft materials. When VELCRO fasteners are used, they form a hard area that often is readily detected and chewed by dogs. This is not a problem with cats. Cats normally will not attack an area in a toy that is hard or that appears to have a texture, hardness, shape or other property that is different from other parts of the toy.

A seventh advantage of the toy 75 in FIGS. 9 and 10 is that end or "tail" 83 readily "flops" when toy 75 is shaken by a dog. Dog typically enjoy shaking toys that have floppy parts.

An eighth advantage of the toy 75 in FIGS. 9 and 10 is that drawstring 81 can be made of strong rope that permits a dog to grasp end 83 and shake toy 75. Dogs often like to grasp a toy extremity to shake a toy, especially a "floppy" toy extremity.

A ninth advantage of the toy 75 in FIGS. 9 and 10 is that even if a dog recognizes hem 80 as a closure area and attempts to gain entry into the toy, the compact low profile of hem 80 in the closed position makes it difficult for a dog to chew on the closed hem area 80.

A tenth advantage of the toy 75 in FIGS. 9 and 10 is that it tends to be safer for a dog to use because the dog can not scratch its face, teeth, or gums on VELCRO fasteners, because the dog is less likely to open successfully the toy and remove a play article that could potentially injure the dog, and because the dog is less likely to chew the toy at all. Some sound modules that might be placed in a pouch 77 that is inserted in interior 76 include batteries or other components that a dog should not chew. If a dog chews a piece of VELCRO fastener, the resulting pieces can injure the dog's tongue or teeth and can injure the dog's intestinal tract if ingested.

An eleventh advantage of the toy of FIGS. 9 and 10 is that when a dog grasps end 83 and shakes toy 75, this functions to tighten hem 80 and further secure the closure of opening 100.

In toy 75, opening 100 is formed generally in the stomach area of the toy. One or more openings 75 can be formed at any desired location in a toy 75.

Opening 100 can have any shape and dimension, but preferably has a round or oval shape. Openings provided with VELCRO fasteners typically include opposing curvilinear sections and are more readily identified by a dog when closed. A circular or oval opening that is closed with a drawstring significantly reduces the visible size of an opening 100, as is demonstrated by the small visible area of closed hem 80 in FIGS. 9 and 10.

The material utilized to fabricate drawstring 81 and/or hem 80 can, if desired, be elastic, generate a minimal amount of surface friction (i.e., be "slick" or smooth), or have any other desired characteristics that facilitate the ready sliding of drawstring 81 through hem 80. It is, however, desirable that drawstring 81 not slide through hem 80 too readily, because once the hem 80 is in the closed orientation of FIGS. 9 and 10, it is desirable the hem 80 "hold" and not readily open. When a user wishes to open the closed hem 80 of FIG. 9 and 10, the user inserts fingers through the center of hem 80 and open 100 and works hem 80 open by gently pulling outwardly.

To facilitate inserting end 83 in opening 95, end 83 can be constructed with a rounded or pointed tip that more easily threads into and through opening 95.

Pouch 77A (FIG. 7) can be refillable or can be permanently sealed. If pouch 77A is refillable, VELCRO fasteners or any other open-close fasteners can be utilized to permit the interior 78 of pouch 77A to be accessed to remove an item from or to place an item in interior 78 of pouch 77A. An additional squeaker 78 or other item can be sold or provided with toy 75 at the time of purchase to later be inserted in pouch 77A if the squeaker 78 originally provided in pouch 77A is damaged or rendered inoperable.

Material placed inside shell 75C can, by way of example and not limitation, comprise stuffing that partially or completely fills interior 76 or can comprise fur or another material that lines shell 75C. The lining material can be permanently or removably emplaced in interior 76.

Articles 77, 86 placed in interior 76 of toy 75 can, if desired, be removed so an animal can play with articles 77, 86 separately from shell 75C.

The distance of opening 95 from opening 100 can vary as desired, but is presently preferably in the range of two to four inches. This distance insures that a portion of end 83 (and possibly of portion 84) remains in the interior 76. Even if a dog chews off the portion of end 83 that extends outside shell 75C and opening 95, a portion of tail 83 remains along with the portions of drawstring 81 housed in hem 80, which portions may collectively be sufficient to function as a drawstring for hem 80. The two to four inch distance between opening 100 and opening 95 also makes it unlikely that a dog will identify the "weak area" of toy 75, i.e. will identify the existence and location of opening 100.

Having set forth the presently preferred embodiments of our invention in such terms as to enable those skilled in the art to make and use the invention, I claim:

1. A stuffed animal toy configured to stimulate at least one sense of an animal during play by said animal, said toy comprising
   (a) a shell formed of a first pliable material and having an interior;
   (b) a pouch formed of a second pliable material and contained within said shell during play;
   (c) a play stimulation item wholly contained within said pouch and configured to issue an emission detectable through said pouch and said shell by at least one sense of said animal;
   (d) an opening formed in said shell for admitting said pouch into said interior and having a margin;
   (e) a hem formed along said margin;
   (f) a draw string extending through and from said hem to draw said hem closed.

2. An animal toy configured to stimulate at least one sense of an animal during play by said animal, said toy comprising
   (a) a shell formed of a first pliable material and having an interior;
   (b) a pouch formed of a second pliable material and contained within said shell during play;
   (c) a play stimulation item wholly contained within said pouch and configured to issue an emission detectable through said pouch and said shell by at least one sense of said animal;
   (d) an opening formed in said shell for admitting said pouch into said interior and having a margin;
   (e) a hem formed along said margin;
   (f) a draw string extending through and from said hem to draw said hem closed, said draw string having at least one outer end;
   (g) a second opening formed through said shell to receive said outer end when said drawstring draws said hem closed.

3. An animal toy configured to stimulate at least one sense of an animal during play by said animal, said toy comprising
   (a) a shell formed of a first pliable material and having an interior;
   (b) a play article contained within said shell and configured to stimulate at least one sense of said animal;
   (c) an opening formed in said shell for admitting said play article into said interior and having a margin;
   (d) a hem formed along said margin;
   (e) a draw string extending through and away from said hem to draw said hem closed.

4. An animal toy configured to stimulate at least one sense of a dog during play and to reduce the likelihood the dog will damage the toy by chewing on the toy, said toy comprising
   (a) a shell formed of a first pliable material;
   (b) an interior in said shell shaped and dimensioned to store a play article, said play article configured to stimulate at least one sense of the animal;
   (c) a first opening formed in said shell for admitting said play article into said interior and having a margin;
   (e) a hem formed along said margin;
   (f) a draw string extending through said hem and having at least one outer end;
   (g) a second opening formed through said shell and shaped to slidably receive said outer end of said drawstring;
   (h) said hem, first opening, and drawstring having at last two operative positions,
   (i) a first open position with said first opening and hem open to permit said play article to pass therethrough, and
   (ii) a second closed position with (A) said drawstring pulled to close said hem and said first opening, and (B) said outer end extending through said first opening, through said interior, through said second opening and outside said shell.

* * * * *